United States Patent
Yamaki

(10) Patent No.: US 7,840,694 B2
(45) Date of Patent: Nov. 23, 2010

(54) CONVERTER FOR CONVERTING COMMUNICATION METHOD AND/OR COMMUNICATION PROTOCOL

(75) Inventor: Masahide Yamaki, Tokyo (JP)

(73) Assignee: Olympus Medical Systems Corp. (JP)

( * ) Notice: Subject to any disclaimer, the term of this patent is extended or adjusted under 35 U.S.C. 154(b) by 284 days.

(21) Appl. No.: 11/927,832

(22) Filed: Oct. 30, 2007

(65) Prior Publication Data
US 2009/0113064 A1 Apr. 30, 2009

(51) Int. Cl.
G06F 13/00 (2006.01)
(52) U.S. Cl. .................. 709/232; 709/246; 709/230
(58) Field of Classification Search .......... 709/230, 709/232, 246
See application file for complete search history.

(56) References Cited

U.S. PATENT DOCUMENTS

| | | | |
|---|---|---|---|
| 7,430,608 B2 * | 9/2008 | Noonan et al. | 709/230 |
| 2003/0103088 A1 | 6/2003 | Dresti et al. | |
| 2003/0105389 A1 * | 6/2003 | Noonan et al. | 600/300 |
| 2007/0233888 A1 * | 10/2007 | Yamaki | 709/230 |
| 2008/0004904 A1 * | 1/2008 | Tran | 705/2 |
| 2008/0019393 A1 * | 1/2008 | Yamaki | 370/467 |
| 2008/0103554 A1 * | 5/2008 | Dicks et al. | 607/60 |
| 2009/0112630 A1 * | 4/2009 | Collins et al. | 705/3 |
| 2009/0193435 A1 * | 7/2009 | Yamaki | 719/315 |

FOREIGN PATENT DOCUMENTS

| | | |
|---|---|---|
| JP | 6-197863 | 7/1994 |
| JP | 2001-034567 | 2/2001 |

OTHER PUBLICATIONS

Richard Schrenker et al.; Building the Foundation for Medical Device Plug-and-Play Interoperability; Medical Electronics Manufacturing; 2001.*
Reiner Zitzmann et al.; Interoperable Medical Devices Due to Standardized CANopen Interfaces; 2007 Joint Workshop on High Confidence Medical Devices, Software, and Systems and Medical Device Plug-and-Play Interoperability; Jun. 2007.*

* cited by examiner

Primary Examiner—Kenneth R Coulter
(74) Attorney, Agent, or Firm—Ostrolenk Faber LLP

(57) ABSTRACT

This is a converter which converts communication methods and/or protocols in order to enable communications between at least one medical equipment (ME) and a medical support control device (MSCD), comprising: a first communication interface corresponding to a communication interface of the MSCD; a plurality of second communication interfaces corresponding to a communication interface of each piece of ME in order to connect the MSCD and a plurality of pieces of ME whose communication methods and/or protocols are different; a determination unit for determining whether a communication connection can be established between each of the plurality of pieces of ME connected through the second communication interface and the converter; and a communication control unit for obtaining a difference between the communication program corresponding to the ME and the connection program and converting the communication protocols of the ME and the MSCD with each other.

15 Claims, 13 Drawing Sheets

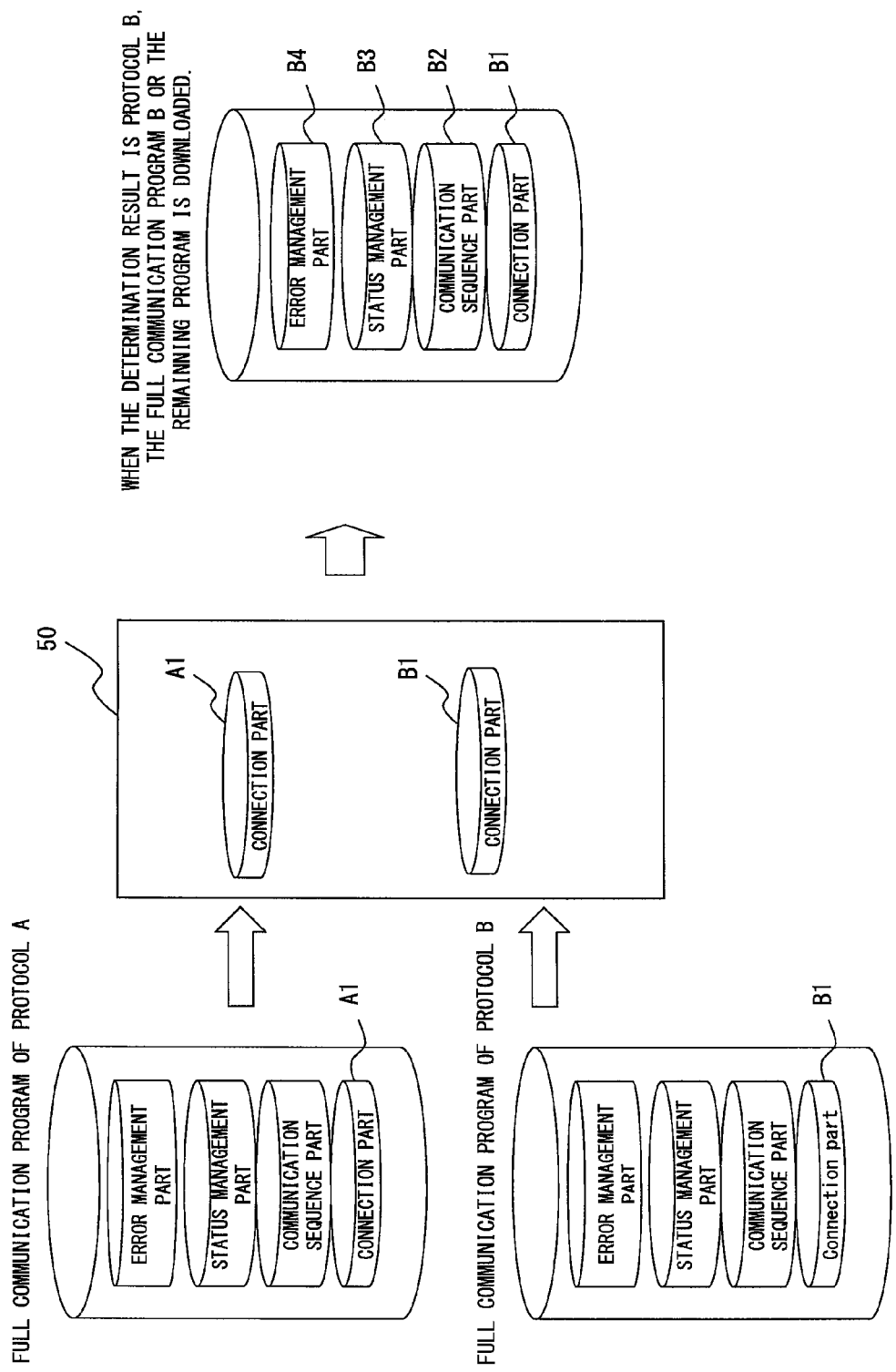
F I G. 4

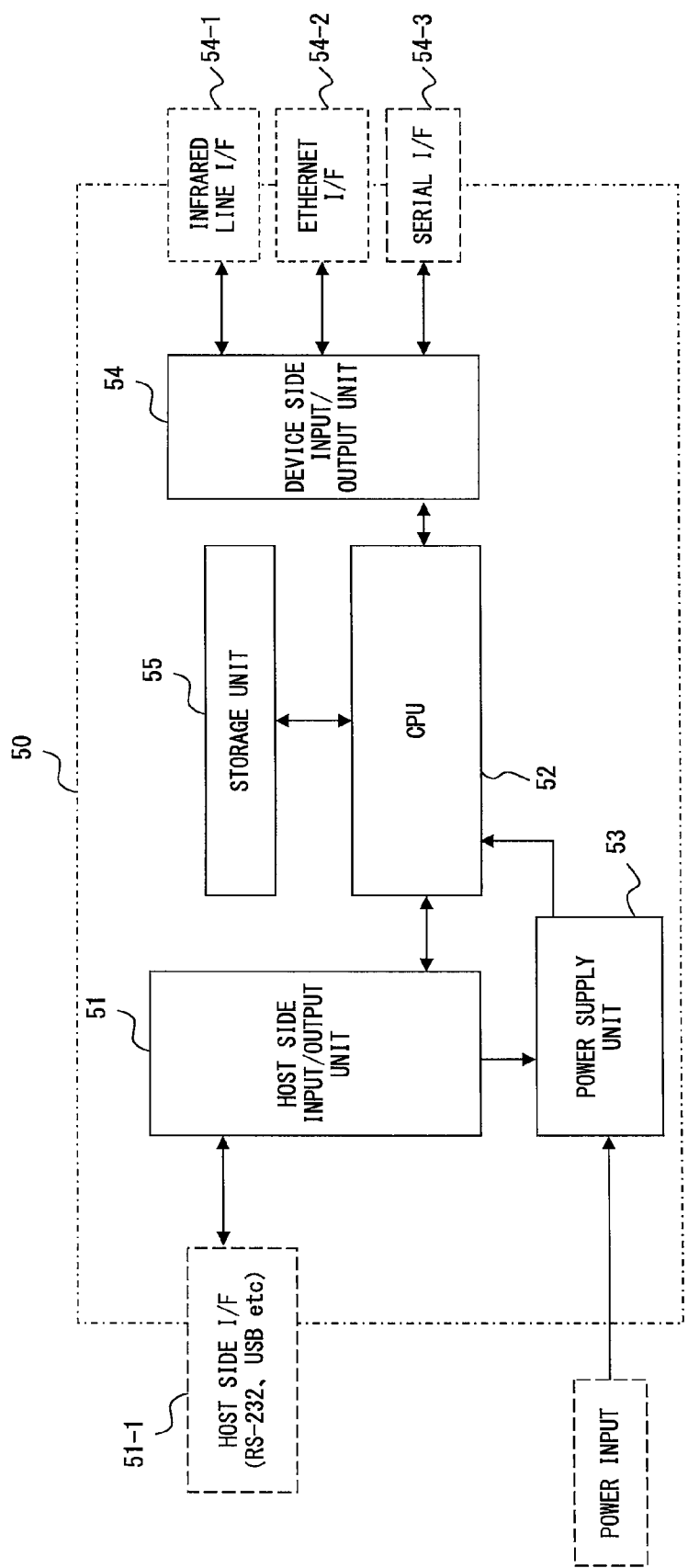
F I G. 8

CONVERTER FOR CONVERTING COMMUNICATION METHOD AND/OR COMMUNICATION PROTOCOL

BACKGROUND OF THE INVENTION

1. Field of the Invention

The present invention relates to a communication technique between a plurality of pieces of medical equipment and a medical support control device for controlling these pieces of medical equipment.

2. Description of the Related Art

Traditionally, in an endoscope operation system, many pieces of medical equipment, such as an endoscope video processor, an endoscope processor light source, an insufflation device, an electrosurgical device and the like, are controlled by a system controller. Such a controller can communicate with various pieces of medical equipment, using a communication interface (hereinafter an interface is referred to as "I/F"), such as RS-232 and the like.

Recently it has been desirable to incorporate not only medical equipment of the same make but medical equipment from different makers, using communications to systemize them. If only medical equipment of the same make is incorporated, each piece of medical equipment can be automatically detected by providing an identifier for each piece of equipment since their communication methods and communication protocols can be shared.

communications such as infrared communications, universal serial bus (USB) communications, RS-232C communications, Ethernet Communications and the like. The different communication systems means a difference in the physical or electrical standards in such various communications, and such a difference includes a difference of a wired interface and a wireless interface, or a difference in connector's configurations (due to the difference in standards, the physical or electrical connection cannot be made). A communication protocol in this case a generally used communication protocol, and indicates the logical connection in contrast to the above-described physical or electrical connection of the communication systems.

SUMMARY OF THE INVENTION

The converter of the present invention for converting communication methods and/or communication protocols between medical equipment and a medical support control device for controlling the medical equipment in order to enable communications between them comprises a first communication interface corresponding to a communication interface with the medical support control device, a plurality of second communication interfaces corresponding to a communication interface with each piece of medical equipment in order to connect the medical support control device to a plurality of pieces of medical equipment whose communication methods and/or communication protocols are different, a determination unit for determining whether a communication connection can be established between the medical equipment connected through the second communication interface and the converter on a basis of a connection program contained in a communication program about the medical equipment, and a communication control unit for obtaining a difference between the communication program corresponding to the medical equipment identified by the determination unit and the connection program or obtaining the communication program corresponding to the medical equipment identified by the determination unit from the medical support control device and converting the communication protocols of the medical equipment and the medical support control device with each other.

The medical support control system of the present invention comprises medical equipment, a medical support control device for controlling the medical equipment, and a converter for converting communication methods and/or communication protocols between the medical equipment and the medical support control device in order to enable communications between them. The converter comprises a first communication interface corresponding to a communication interface with the medical support control device; a plurality of second communication interfaces corresponding to a communication interface with each piece of medical equipment in order to connect the medical support control device to a plurality of pieces of medical equipment whose communication methods and/or communication protocols are different; a determination unit for determining whether a communication connection can be established between the medical equipment connected through the second communication interface and the converter on the basis of a connection program contained in communication programs of the medical equipment; and a communication control unit for obtaining a difference between the communication program corresponding to the medical equipment identified by the determination unit and the connection program or obtaining the communication program corresponding to the medical equipment identified by the determination unit from the medical support control device, and converting the communication protocols of the medical equipment and the medical support control device with each other.

In the communication method and/or protocol converting method of the present invention using a converter installed between medical equipment and a medical support control device for controlling the medical equipment, if the converter is connected to the medical support control device through a first communication interface corresponding to the communication interface of the medical support control device and is connected to the medical equipment by any of a plurality of second communication interfaces corresponding to the communication interface of each piece of medical equipment in order to connect the medical support control device and a plurality of pieces of medical equipment whose communication methods/and or communication protocols are different, the converter determines whether a communication connection can be established between the medical equipment connected through the second communication interface and the converter on the basis of a connection program contained in the communication programs of the medical equipment, obtains a difference between the communication program corresponding to the identified medical equipment and the connection program or obtains the communication program corresponding to the medical equipment identified by the determination unit from the medical support control device, and converts the communication protocols of the medical support control device and the medical equipment with each other.

BRIEF DESCRIPTION OF THE DRAWINGS

FIG. 4 shows the concept of a converter's communication software control when the converter in the first preferred embodiment is used.

FIG. 8 shows a summary of the internal configuration of the converter in the first preferred embodiment.

DESCRIPTION OF THE PREFERRED EMBODIMENTS

The First Preferred Embodiment

Traditionally, when integrating communications with another maker's medical equipment, their communication methods or communication protocols are different depending on maker and it is difficult to identify their equipment.

Figure 1:
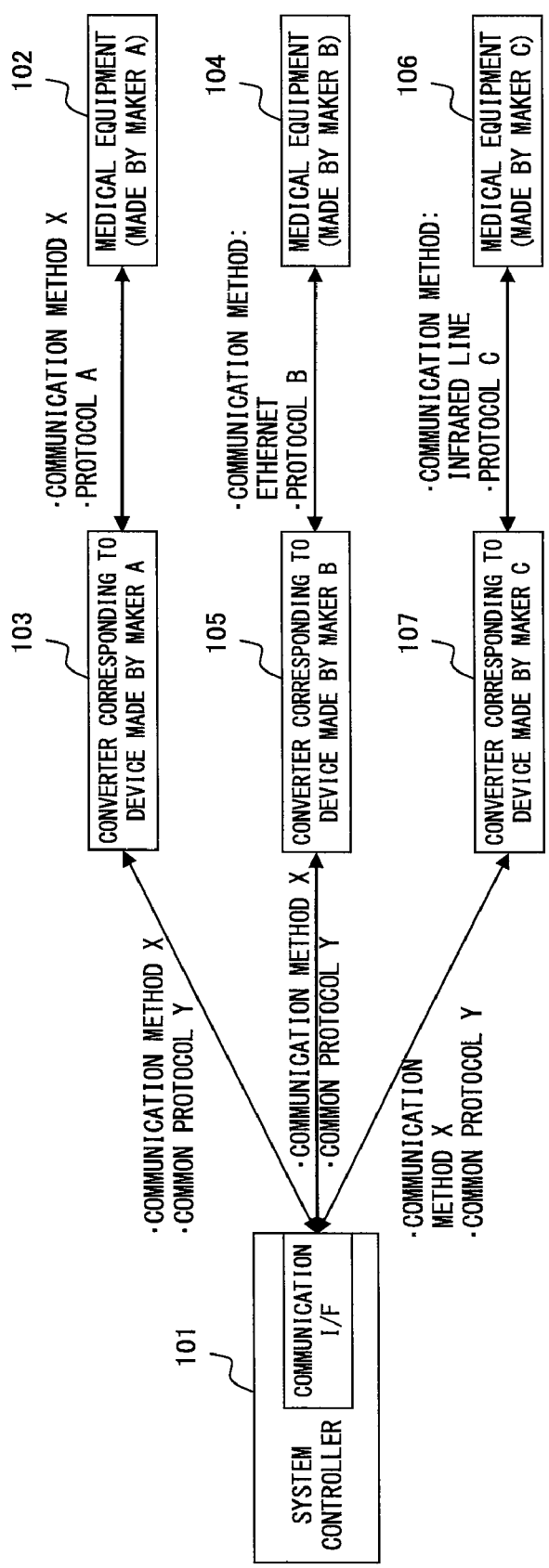
FIG. 1 shows the connection between a traditional system controller of a specific make and various other makers' medical equipment.

FIG. 1 shows the connection between a traditional system controller of a specific make and various other makers' medical equipment. FIG. 1 shows the connection between a system controller 101 and medical equipment 102 made by maker A, medical equipment 104 made by maker B, and medical equipment 106 made by maker C, using converters 103, 105 and 107 corresponding to the communication methods and protocols of makers A, B and C, respectively.

In the communication I/F of the system controller 101, connection and communications are possible using a communication method X (for example, RS-232C) and a protocol Y common to products of its own make (hereinafter called "common protocol").

The communication I/F of medical equipment 102 made by maker A uses the communication method X (for example, RS-232C) and a communication protocol A. In this case, the communication protocols are different between the system controller 101 and the medical equipment 102. Therefore, when connecting the system controller 101 to the medical equipment 102, they must be connected through the converter 103 to exchange their communication protocols with each other.

The communication I/F of medical equipment 104 made by maker B uses the communication method "Ethernet" and a communication protocol B. In this case, the communication method and the communication protocols are different between the system controller 101 and the medical equipment 104. Therefore, when connecting the system controller 101 to the medical equipment 104, they must be connected through the converter 105 to exchange their communication methods and communication protocols with each other.

The communication I/F of medical equipment 106 made by maker C uses the communication method "infrared communication" and a communication protocol C. In this case, the communication method and the communication protocols are different between the system controller 101 and the medical equipment 106. Therefore, when connecting the system controller 101 to the medical equipment 106, they must be connected through the converter 107 to exchange their communication methods and communication protocols with each other.

As described above, when traditionally integrating communications with another maker's medical equipment, a dedicated converter is used for each piece of the other makers' medical equipment.

If one converter corresponds to various other makers' medical equipment, the converter must have a function to automatically identify the other maker's medical equipment. When automatically identifying the other maker's medical equipment, the memory of the converter must store in advance a program for executing the communication methods and protocols of the other maker's medical equipment.

Figure 2:
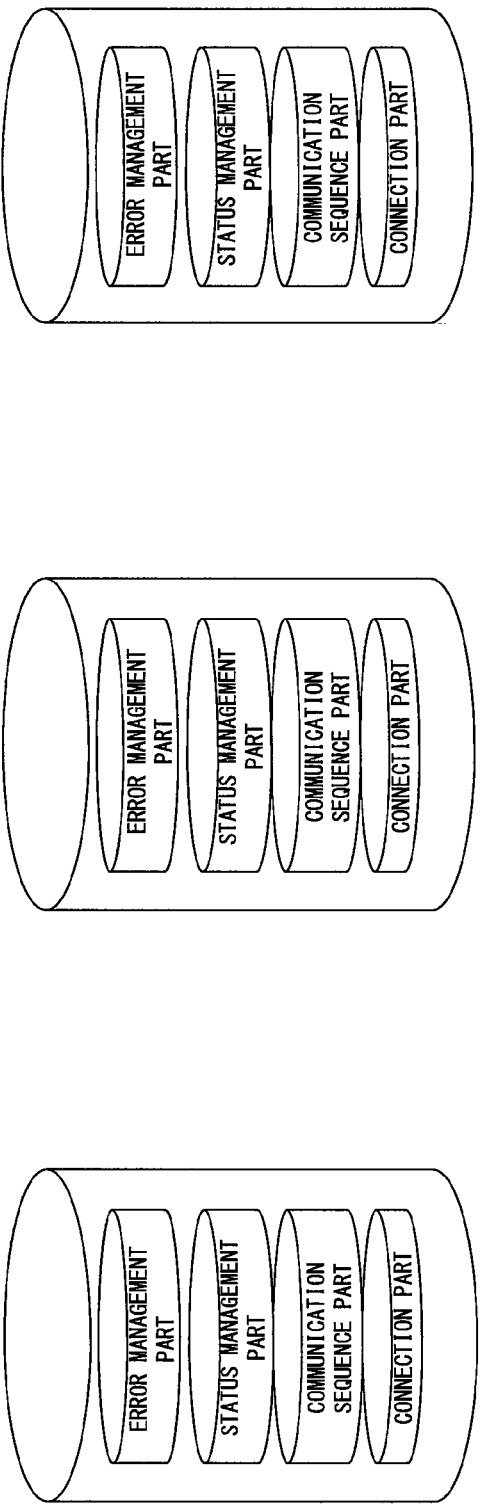
FIG. 2 shows the traditional concept of a converter's communication software control.

FIG. 2 shows the traditional concept of a converter's communication software control. As shown in FIG. 2, the program of each communication protocol comprises a connection part, a communication sequence part, a status management part, and an error management part. The connection part determines whether the connection with partner equipment is established. The communication sequence part communicates with the partner equipment on the basis of the communication protocol after the connection is established. The status management part stores the status of medical equipment, which is predefined, and determines whether a transmitted status is correct by comparing the status transmitted from the partner equipment with this stored status. The error management part manages time-out errors and the like.

Such a program of a communication protocol must be prepared for each piece of a maker's medical equipment. In this case, since a program is stored for each maker, the memory capacity of the converter increases and the higher process capability of a central processing unit (CPU) is required for converting communication protocols. Then, in order to accommodate a large capacity of memory, the size of the converter increases. If memory and a CPU whose specifications are high-grade are mounted, the cost increases.

Therefore, in the first preferred embodiment of the present invention, a converter is described for enabling communications between the system controller and the medical equipment by connecting a system controller and medical equipment using a communication method and a communication protocol which are different from those of this system controller.

Figure 3:
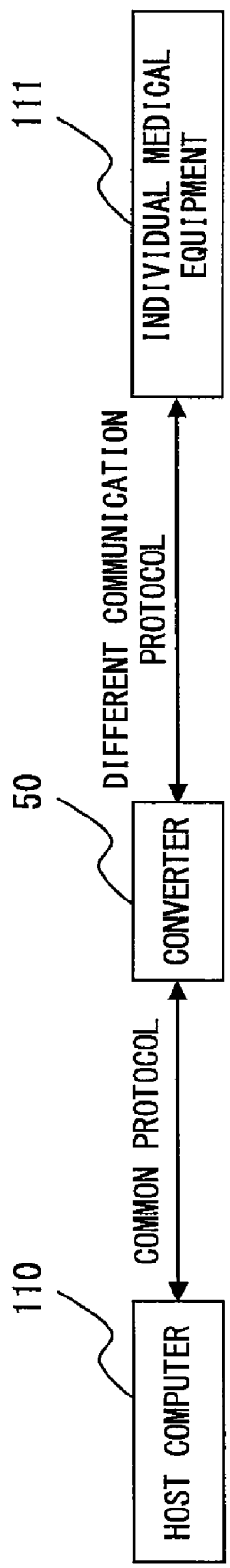
FIG. 3 shows the summary of the medical support control system connected by the converter in the first preferred embodiment.

FIG. 3 shows the summary of the medical support control system connected by the converter in this preferred embodiment. The medical support control system comprises a host computer (hereinafter called "host") 110, a plurality of pieces of medical equipment 111, and a converter 50. In this case, at least one of the communication methods and protocols of each piece of medical equipment 111 differs from that of the host 110.

The converter 50 enables communications between the host 110 and the medical equipment 111 by connecting the medical equipment 111 to the host 110 and performing an interconversion different communications and protocols. The converter 50 is connected to the host 110 using a prescribed communication method and protocol that are shared on the host 110 side. The converter 50 is connected to the medical equipment using a prescribed communication method and protocol corresponding to each piece of medical equipment 111.

FIG. 4 shows the concept of a converter's communication software control when the converter in this preferred embodiment is used. When using the converter 50 in this preferred embodiment, it is sufficient for the converter 50 to store only the connection part of each of the plurality of communication programs. When arbitrary medical equipment is connected, the converter 50 identifies the types of the communication method and protocol on the basis of the connection of each communication program. Although in this preferred embodiment they are identified using the connection part as one example, they can also be identified using a common communication program for obtaining an identifier for identifying equipment or a maker.

The converter 50 downloads the full communication program or a difference between the already downloaded connection part of the connected medical equipment and the communication program from the host 110 on the basis of the determination result.

In FIG. 4, the converter 50 stores only connection parts A1 and B1, which constitute a part of the communication programs about protocols A and B, respectively. If the determination result of the communication protocol is protocol B, the converter 50 downloads the full communication program B or the difference between the already downloaded connection part of the connected medical equipment and the communication program (that is, a communication sequence part B2, a status management part B3, and an error management part B4).

Figure 5:
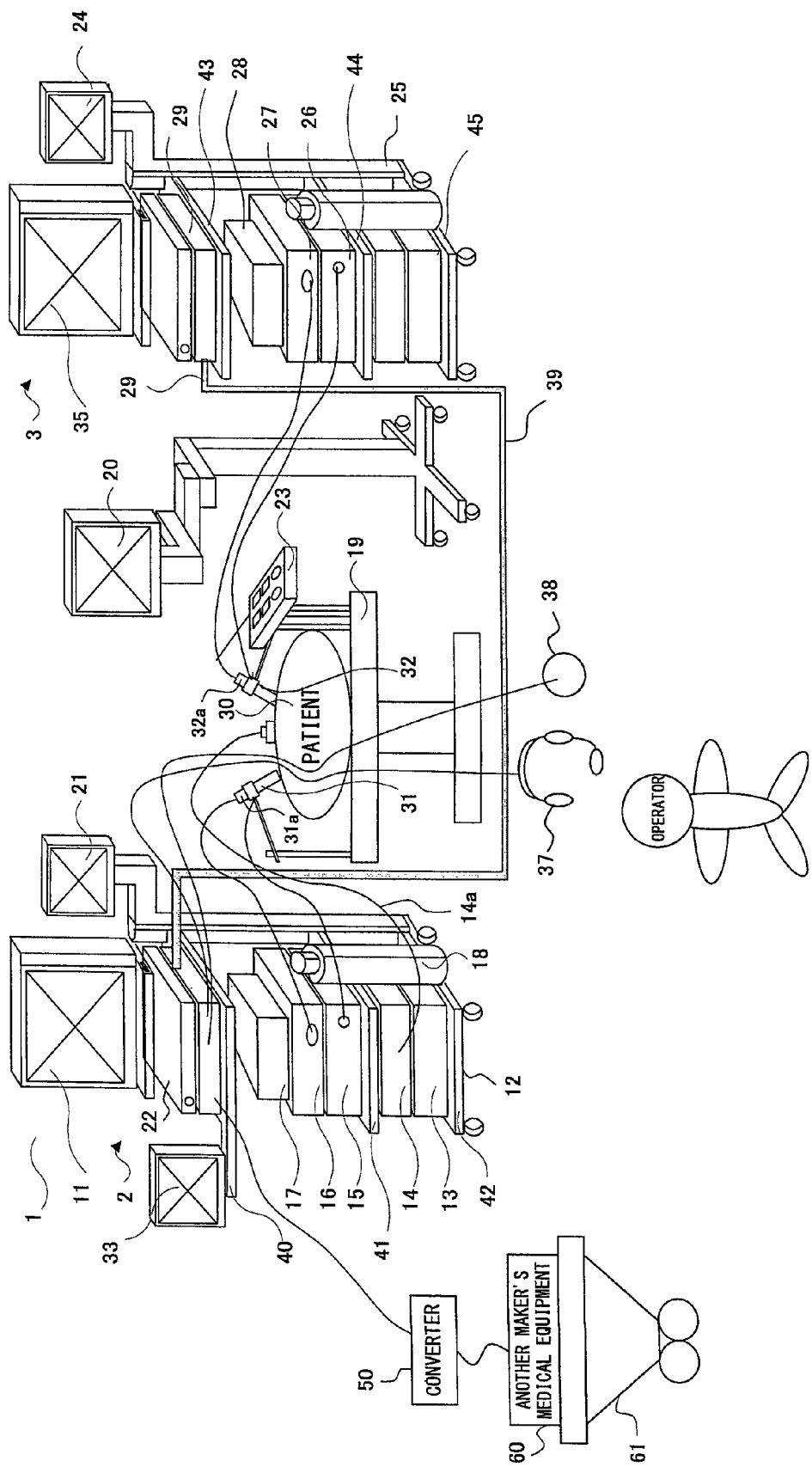
FIG. 5 shows the overall configuration of the endoscope operation system in the first preferred embodiment.

FIG. 5 shows the overall configuration of the endoscope operation system in this preferred embodiment. In an endoscope operation system 1, a first endoscope operation system 2 and a second endoscope operation system 3 are disposed on each side of a patient bed 19 on which a patient 30 lies down.

In each of these endoscope operation systems 2 and 3, a plurality of pieces of endoscope peripheral equipment for performing observation, inspection, treatment, recording and the like are mounted on a first medical trolley 12 and a second medical trolley 25, respectively. Around the patient bed 19 a movable stand is disposed. On the movable stand an endoscope display panel 20 is mounted.

The first medical trolley 12 comprises a trolley top plate 40, a trolley shelf 41, and a base plate unit 42 on the top, middle and bottom stages, respectively. On the trolley top plate 40 an endoscope display panel 11 and a system controller 22 are disposed. On the trolley shelf 41 a VTR 17, a video processor 16 and an endoscope light source 13 are disposed. In the base plate unit 42 an insufflation device 14 and an electrosurgical knife device 13 are disposed. In the arm part of the first medical trolley 12, a centralized operation panel 33 and a centralized display panel 21 are disposed. On the first medical trolley 12 a diagnostic ultrasound system, a printer or the like as not shown in FIG. 5 can also be mounted.

On the centralized operation panel 33, which comprises a pointing device such as a mouse and a touch panel, a nurse or the like located in a non-sterilized area collectively operates each piece of medical equipment to collectively manage/control/operate the medical equipment.

Each piece of medical equipment is connected to the system controller 22 through a serial interface cable, which is not shown in FIG. 5, to conduct bi-directional communications. A microphone 37 and a speaker 38 can be connected to the system controller 22.

The endoscope light source 15 is connected to a first endoscope 31 through a light-guide cable for transmitting illumination light. When being supplied to the light guide of the first endoscope, the illumination light of the endoscope light source 15 illuminates an affected part and the like in the abdomen of the patient 3 into which the insertion part of the first endoscope 31 is inserted.

The eyepiece part of this first endoscope 31 is equipped with a first camera head 31a provided with a camera device. The observation optical system of the first endoscope 31 shoots and forms the optical image of the affected part and the like using the camera device in the first camera head 31a. Then, the data of the shot and formed optical image is transmitted to the video processor 16 through a camera cable. The signals of the optical image data are processed by a signal processing circuit in the video processor 16 and video signals are generated. Then, the video signals are output to the endoscope display panel 11 through the system controller 22 and the endoscope image of the affected part and the like is displayed on the endoscope display panel 11.

An external storage medium (MO), which is not shown in FIG. 5, is built into the system controller 22. Thus, the system controller 22 can read the image recorded on the external storage medium (MO) and output it onto the endoscope display panel 11 to display it. The system controller 22 is connected to a network that is installed within a hospital (intra-hospital network), which is not shown in FIG. 5, by a cable, which is also not shown in FIG. 5. Thus, the system controller 22 obtains image data and the like on the intra-hospital network and outputs it onto the first endoscope display panel 11 to display it. The system controller 22 corresponds to the host shown in FIG. 3.

A bottle 18, of a gas such as $CO_2$ or the like, is connected to the insufflation device 14. Then, the gas $CO_2$ can be supplied into the abdomen of the patient 30 through a tube 14a extended from the insufflation device 14 to the patient 30.

The second medical trolley 25 comprises a trolley top plate 43, a trolley shelf 44, and a base plate 45 on the top, middle and bottom stages, respectively. On the trolley top plate 43, an endoscope display panel 35, and a relay unit 29 are disposed. On the trolley shelf 44, a VTR 28, a video processor 27, and an endoscope light source 26 are disposed. In the base plate unit 42, other medical equipment such as a ultrasonic treatment device, a lithotripter, a pump, a shaver and the like are mounted. Each piece of equipment is connected to the relay unit 29 through a cable, which is not shown in FIG. 5, and bi-directional communications are possible. In the arm part of the second medical trolley 25 a centralized display panel 24 is disposed.

The endoscope light source 26 is connected to the second endoscope 32 through a light guide cable for transmitting illumination light. The illumination light of the endoscope light source 26 is supplied to the light guide of the second endoscope 32. Thus, an affected part and the like in the abdomen of the patient 30 into which the insertion part of this second endoscope 32 is inserted is illuminated.

The eyepiece part of this second endoscope 32 is equipped with a second camera head 32a provided with a camera device. The observation optical system of the second endoscope 32 shoots and forms the optical image of the affected part and the like using the camera device in the second camera head 32a. Then, the data of the shot and formed optical image is transmitted to the video processor 27 through a camera cable. The signals of the optical image data are processed by a signal processing circuit in the video processor 27, and video signals are generated. Then, the video signals are outputted to the endoscope display panel 35 through the system controller 22 and the endoscope image of the affected part and the like is displayed on the endoscope display panel 35.

The relay unit 29 is connected to the system controller 22 by a relay cable 39.

Furthermore, the system controller 22 can also be controlled by an operator wireless remote controller 23 by which an operator operates equipment from a sterilized area. Other equipment (for example, a printer, a diagnostic ultrasound system and the like) can also be mounted on the first medical trolley 12 and the second medical trolley 25.

Another maker's medical equipment 60, such as an electrosurgical knife device, a insufflation device and the like is mounted on a cart 61, which is connected to the system controller 22 through the converter 50.

Figure 6:
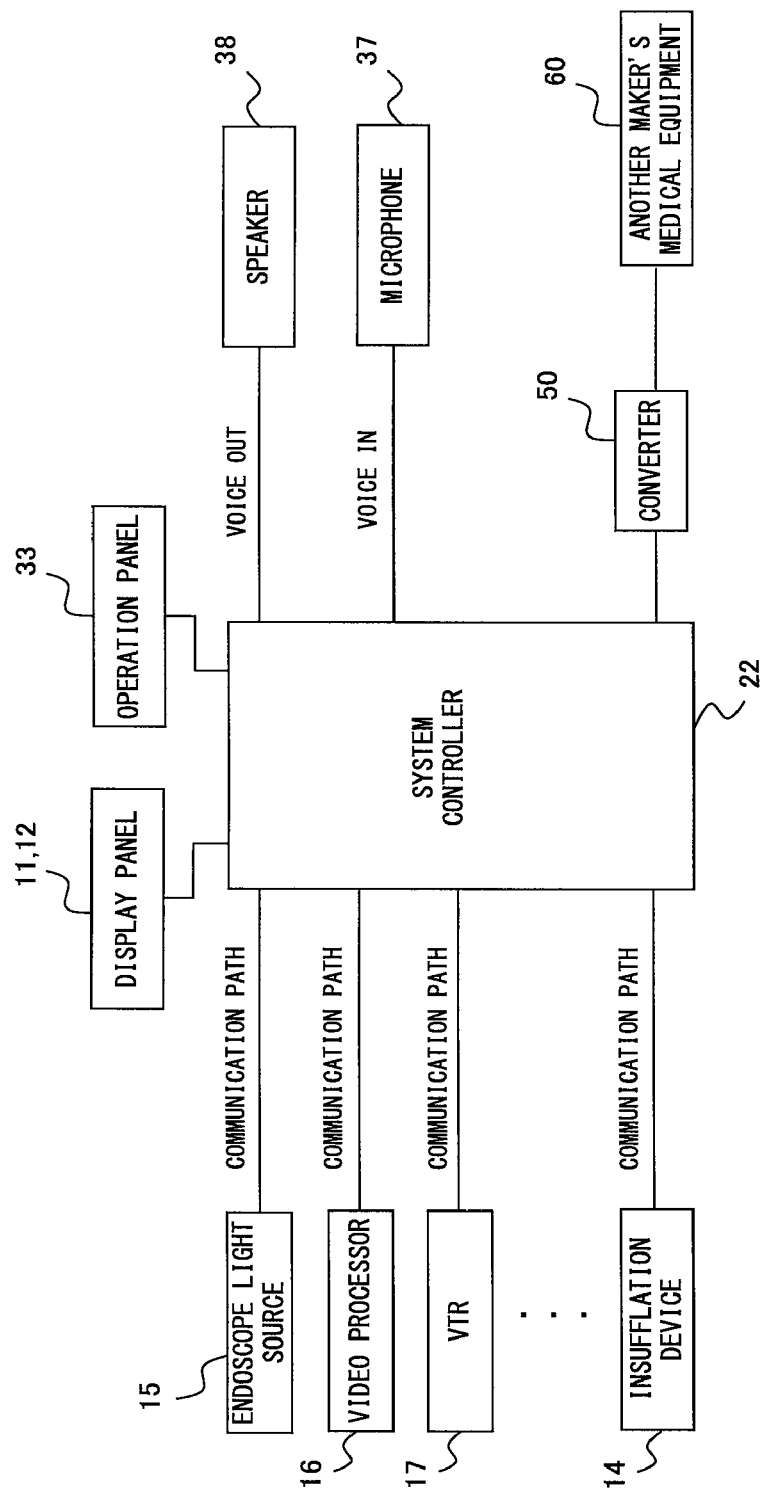
FIG. 6 is a block diagram showing the connection relationship between medical equipment constituting the endoscope operation system shown in FIG. 5.

FIG. 6 is a block diagram showing the connection relationship between medical equipments constituting the endoscope operation system shown in FIG. 5. As shown in FIG. 6, the endoscope display panel 11, the centralized display panel 21, and the centralized operation panel 33 are connected to the system controller 22. A microphone 37 for inputting voice and a speaker 38 for outputting voice are also connected to the system controller 22. Medical equipment using a common communication protocol, such as the endoscope light source 15, the video processor 16, the VTR 17, . . . , insufflation device 14 and the like are also connected to the system controller 22. Furthermore, another maker's medical equipment 60 using a different communication method or protocol is connected to the system controller 22 through the converter 50.

Figure 7:
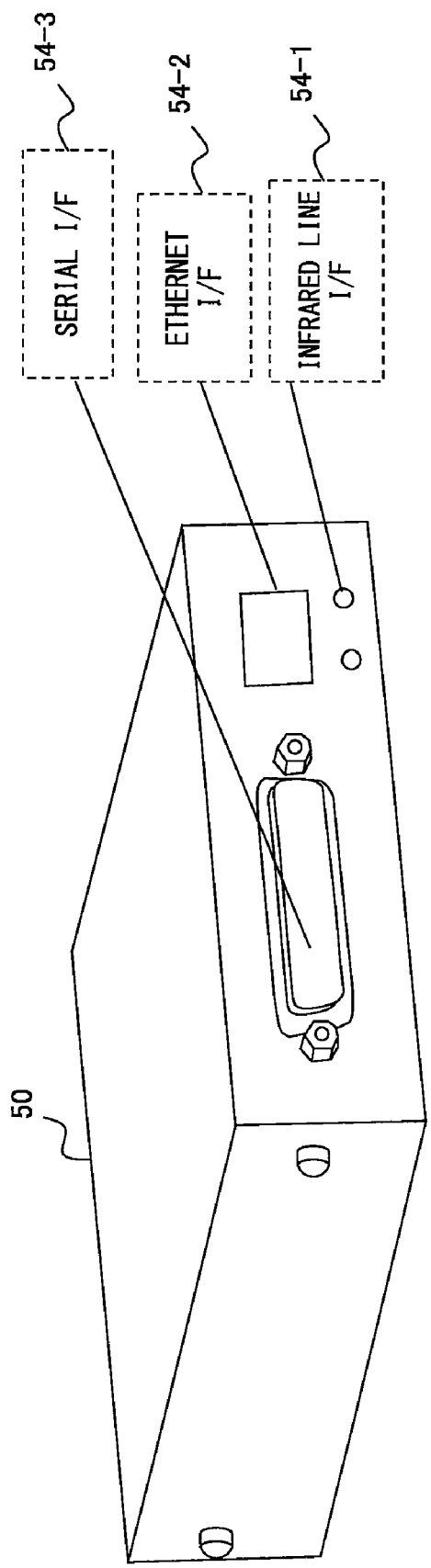
FIG. 7 is one example of the perspective view of the cabinet of the converter in the first preferred embodiment.

FIG. 7 is one example of the perspective view of the cabinet of the converter in this preferred embodiment. The converter 50 is provided with communication I/Fs (such as an infrared communication I/F, an Ethernet communication I/F, a serial communication I/F and the like) corresponding to a plurality of different communication methods and protocols in order to enable the connection to medical equipment using various different communication method and protocols.

In FIG. 7, as one example, an infrared communication I/F 54-1, an Ethernet communication I/F 54-2, and a serial communication I/F 54-3 are provided on the front side. A communication I/F corresponding to the communication I/F of the system controller 22 is provided on the back side, which is not shown in FIG. 7. The communication I/Fs provided for the converter 50 are not limited to these and any interface as heretofore known can be used.

FIG. 8 shows the summary of the internal configuration of the converter in this preferred embodiment. A host side input/output unit 51, a CPU 52, a power supply unit 53, a device side input/output unit 54, and a storage unit 55 are provided in the converter 50.

The host side input/output unit 51 outputs and inputs data to and from the host 110, respectively, through the communication I/F 51-1 corresponding to the communication method and protocol of the communication I/F (such as RS-232C, USB and the like) on the host 110 side (system controller 22 side).

The power supply unit 53 converts power supplied from an external power supply to a level that the converter 50 can use and supplies it to each part in the converter 50.

The storage unit 55 stores the program of this preferred embodiment, a program downloaded from the host 110 and the like. For the storage unit, ROM, RAM, a hard disk drive, flash memory and the like are used. Although in this preferred embodiment, the storage 55 is built into the converter 50, it can also be installed externally (for example, using portable storage media such as USB memory, SD memory card and the like).

The CPU (central processing unit) 52 controls the operation of each component constituting the converter 50 and reads/executes programs stored in the storage unit 55.

The device side input/output unit 54 inputs and outputs data through interfaces such as the infrared communication I/F 54-1, the Ethernet communication I/F 54-2, the serial communication I/F 54-3 and the like.

Figure 9:
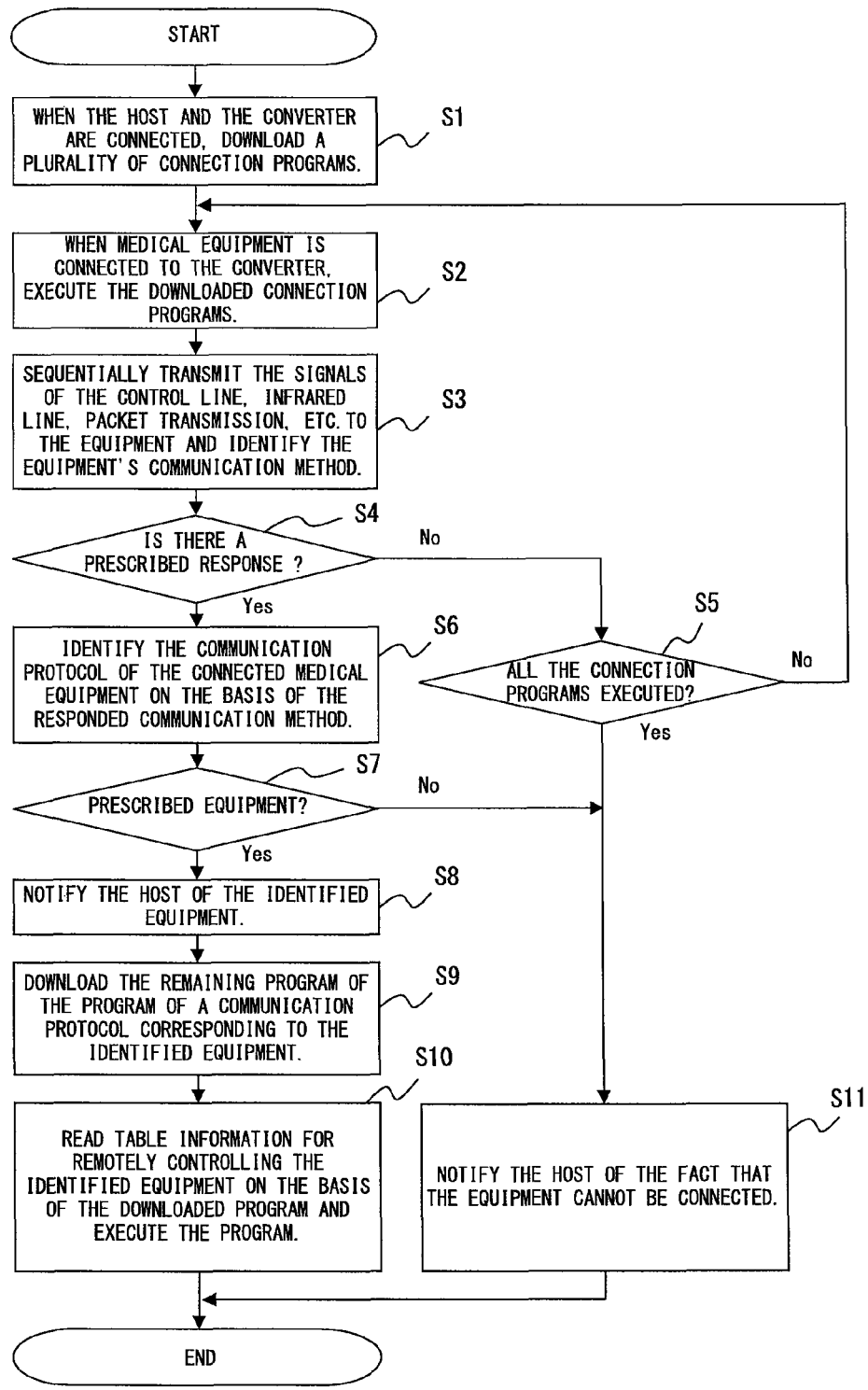
FIG. 9 shows the operation flow of the converter in the first preferred embodiment.

FIG. 9 shows the operation flow of the converter in this preferred embodiment. The host 110 stores communication programs corresponding to communication protocols used in various other makers' medical equipment to remotely control each piece of medical equipment. In this case, as described above, the communication program comprises a connection part (connection program), a communication sequence part (communication sequence program), a status management part (status management program) and an error management part (error management program).

Firstly, when being connected to the host 110, the converter 50 downloads the connection program of each of the plurality of communication programs (S1). The plurality of downloaded connection programs is stored in the storage unit 55.

Then, when being connected to any piece of medical equipment, the converter 50 reads and executes one of the connection programs stored in the storage unit 55 (S2).

The communication method of target medical equipment is identified by sequentially transmitting the signals of a control line, an infrared line, a packet transmission and the like to the connected medical equipment (hereinafter called "target medical equipment) (S3). Specifically, if the target medical equipment responds to the transmission of the converter 50, it can be determined that the communication method of the target medical equipment is the communication method used for the response, which could be an infrared communication, an Ethernet communication, a USB communication and the like.

Until each piece of target medical equipment responds, the converter 50 sequentially executes the downloaded programs and transmits the signals of the control line, the infrared, packet transmission and the like to each piece of the target equipment (repetition of S2 and S3). If the target medical equipment does not respond even when all of the downloaded connection programs are executed (No in S4 and Yes in S5), the fact that no connection program corresponds to the target is reported to the host 110 (S11).

If any piece of the target medical equipment responds (Yes in S4), the converter 50 identifies the communication protocol of the target medical equipment on the basis of the communication method used to respond (S6). The communication protocol of target medical equipment is identified, for example, by the converter 50 sequentially applying a sequence for detecting a bit rate, a sequence for detecting an ID that is returned, a sequence for detecting a header in a packet and the like, to the target medical equipment. Then, if the target medical equipment can be identified, the communication protocol of the target medical equipment can be specified on the basis of the identification result. For example, in the case of RS-232C, the communication protocol can be specified by identifying a difference in transfer speed (bit rate) and a variation in message. In the case of USB, the communication protocol can be specified by identifying, for example, a variation in a descriptor or a procedure. In the case of a parallel communication, the communication protocol can be specified by identifying, for example, a variation in a signal pattern and the like.

If, as a result of the communication protocol identification in S6, the communication protocol of the target medical equipment cannot be identified or if the target medical equipment is not prescribed equipment but the communication protocol of the target medical equipment can be identified (S7), the converter 50 notifies the host 110 that no connection program corresponds to the target medical equipment (S11).

If as a result of the communication protocol identification in S6, the communication protocol can be specified and the target medical equipment is prescribed equipment (Yes in S7), the converter 50 notifies the host 110 of the identified medical equipment (S8).

Upon receipt of the notice of the identification result in S8, the host 110 transmits the remaining communication program corresponding to the target medical equipment (i.e., the remaining communication program equals a program excluding a connection program of the communication program, and specifically includes the communication sequence program, the status management program and the error management program). The converter 50 receives the remaining program from the host 110 (S9). The converter 50 merges the remaining program and the already-stored connection program into one communication program.

The communication program downloaded from the converter 50 cannot also be the remaining program. For example, the full communication program corresponding to the medical equipment including the connection program can also be downloaded.

The converter 50 reads a table storing status information for remotely controlling the target medical equipment from the communication program and executes the communication program (the communication sequence program, the status management program, and the error management program). Thus, the host 110 can communicate with the target medical equipment through the converter 50 and also the host 110 can remotely control the target medical equipment.

According to this preferred embodiment, there is no need for a converter to store the full programs of all the communication programs. Since it is sufficient if the converter stores only the connection part of each of all the communication programs (several % of the data size of the full program for its communication protocol), no large capacity of memory is needed. Therefore, the converter can be miniaturized.

A user can connect medical equipment to a system controller without paying any attention to the communication method and protocol of medical equipment connected to the system controller.

In this preferred embodiment, a communication program including a connection program corresponding to each piece of medical equipment and a program for remotely controlling target medical equipment are downloaded from a host and are stored in the storage unit of a converter, which is not a requirement. For example, a portable storage medium (such as USB memory, an SD memory card and the like) on which are recorded in advance a communication program including a connection program corresponding to each piece of medical equipment and a program for remotely controlling each piece of target medical equipment can also be set in the converter 50.

The Second Preferred Embodiment

In this preferred embodiment, the range of a connection program to be downloaded in advance is limited by changing over a DIP switch provided for a converter. Descriptions of the same parts of this preferred embodiment as the first preferred embodiment are omitted.

Figure 10:
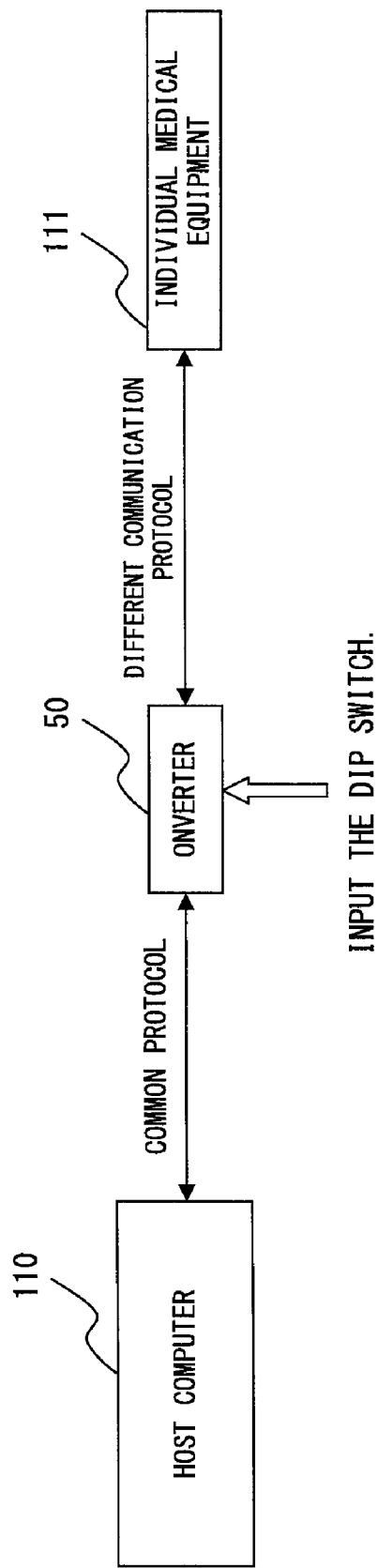
FIG. 10 shows a summary of the internal configuration of the converter in the second preferred embodiment.

FIG. 10 shows a summary of the converter in this preferred embodiment. This preferred embodiment differs from the first preferred embodiment only in that the converter 50 is provided with a DIP switch for selectively downloading the connection program of prescribed medical equipment of all the connection programs to be downloaded in advance.

Figure 11:
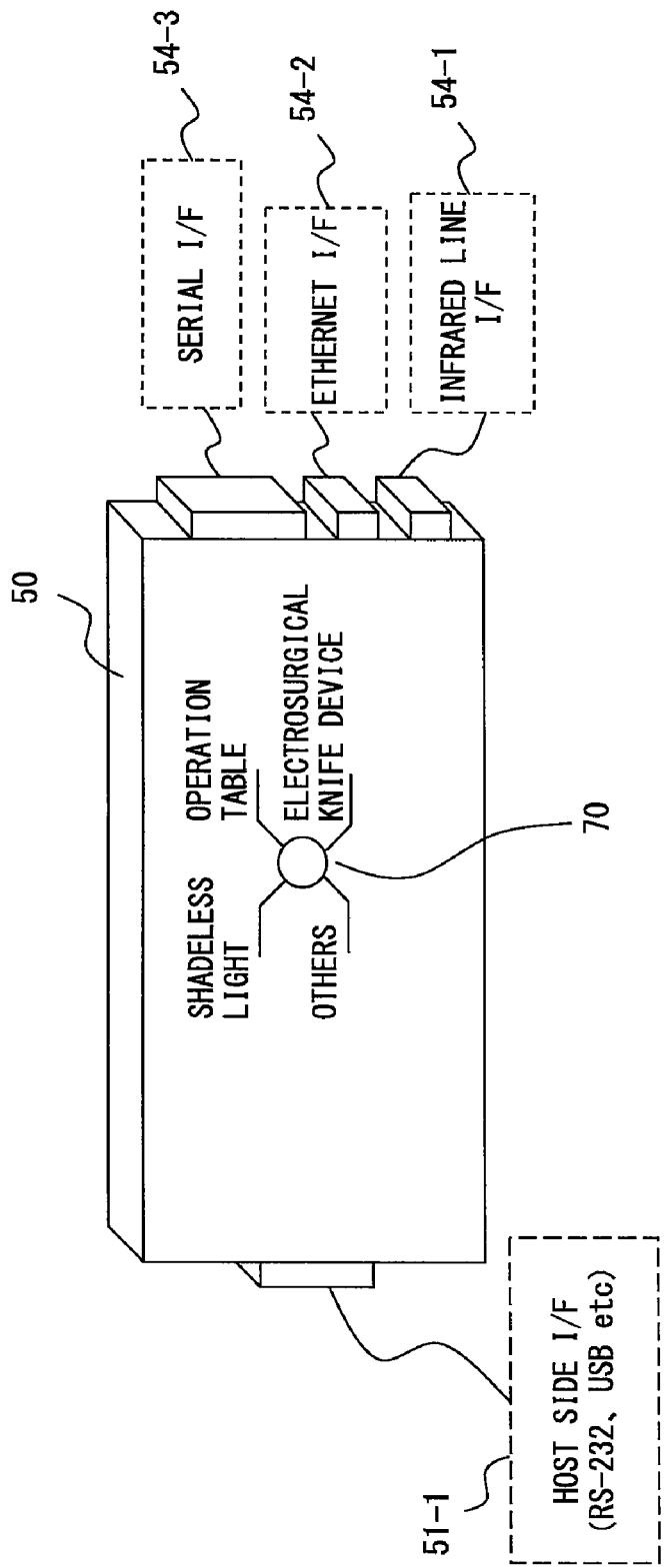
FIG. 11 is one example of the bottom view of the cabinet of the converter in the second preferred embodiment.

FIG. 11 is one example of the bottom view of the cabinet of the converter in this preferred embodiment. A DIP switch for specifying medical equipment to be connected is provided on the bottom surface of the converter 50. In FIG. 11, for the DIP switch, a rotary switch 70 is provided. By using this rotary switch 70, the category of medical equipment, such as "operating table" "electrosurgical knife device", "shadowless light", "others" and the like, can be selected.

For example, if "electrosurgical knife device" is selected by the rotary switch 70, the converter 50 can download only the connection program of medical equipment "electrosurgical knife device" from the host 110 as a connection program to be downloaded in advance.

Figure 12:
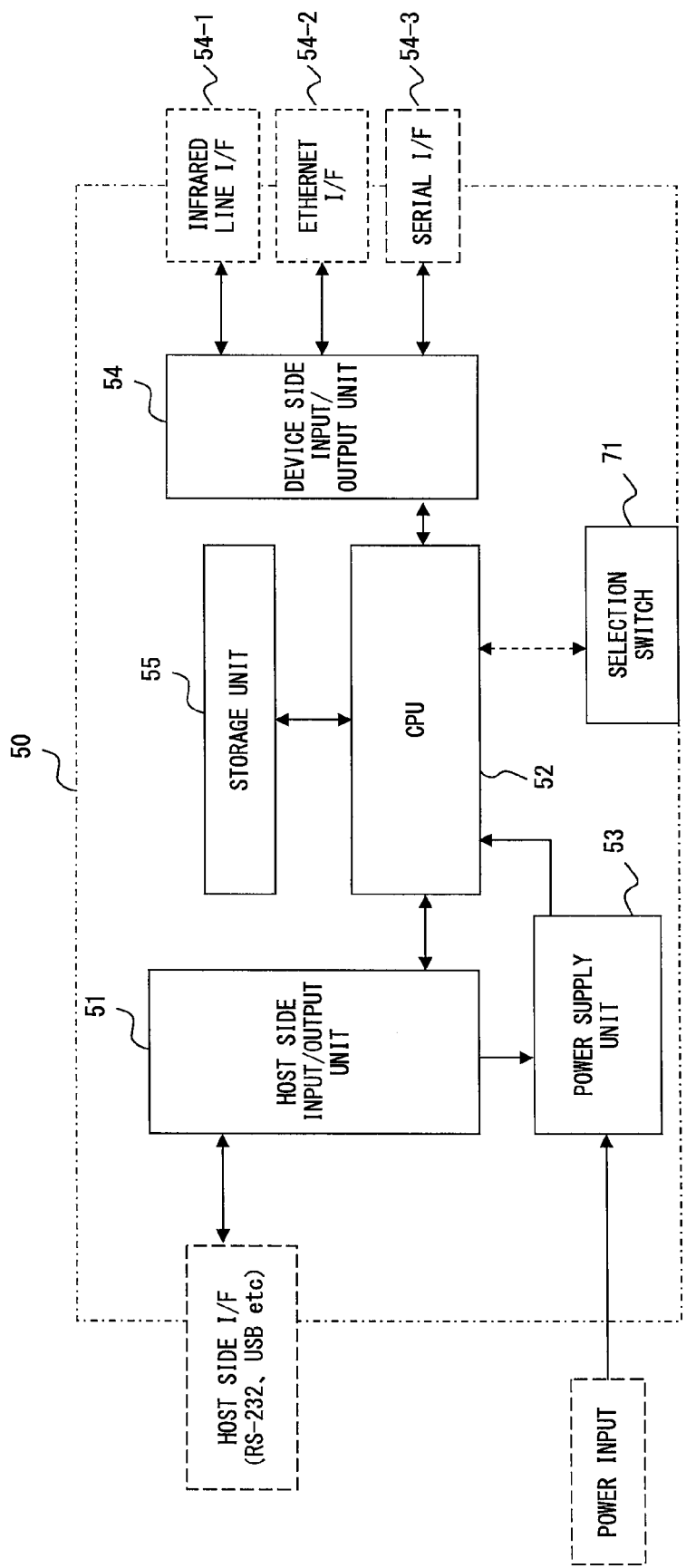
FIG. 12 shows a summary of the internal configuration of the converter in the second preferred embodiment.

FIG. 12 shows a summary of the internal configuration of the converter in this preferred embodiment. The converter 50 shown in FIG. 12 can be obtained by adding a selection switch I/F 71 to the converter shown in FIG. 8. The setting information set by the rotary switch 70 is transmitted to the CPU 52 through the selection switch I/F 71. The CPU 52 can download the connection program of the category of medical equipment corresponding to the setting information.

Figure 13:
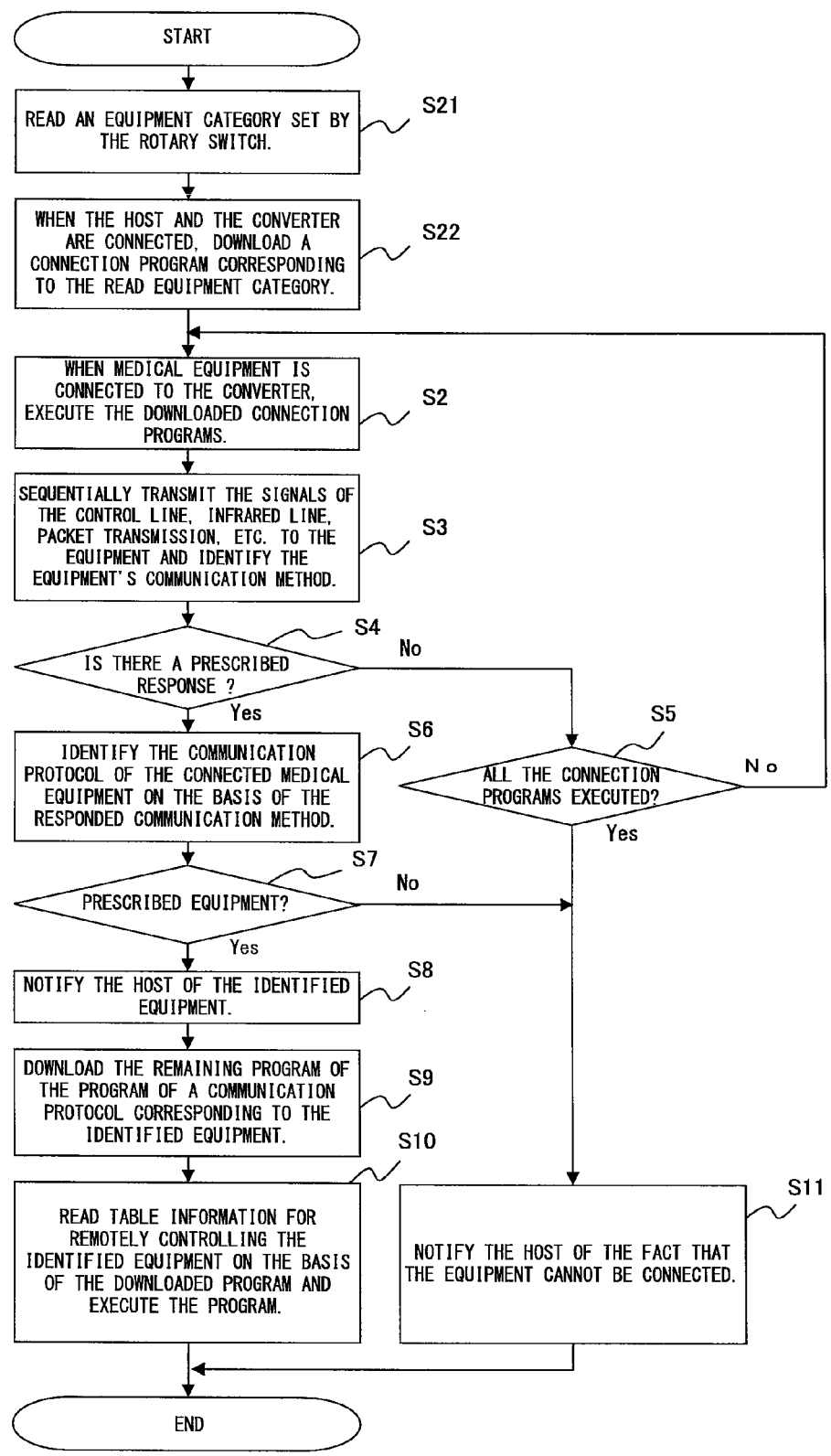
FIG. 13 shows the operation flow of the converter in the second preferred embodiment.

FIG. 13 shows the operation flow of the converter in this preferred embodiment. Firstly, a user selects the category of medical equipment connected to the converter 50 by changing over the rotary switch 70. Then, the CPU 52 of the converter 50 reads the equipment category selected by the rotary switch 70 (S21).

Then, when being connected to the host 110, the converter 50 downloads the connection program of medical equipment corresponding to the equipment category read in S21 from the host 110 (S22). The downloaded connection program is stored in the storage unit 55.

Then, when arbitrary medical equipment is connected to the converter 50, the converter 50 stores it in the storage unit 55 and reads and executes one of the connection programs (S2). The processes after this are the same as those shown in S2~S11.

In this preferred embodiment, it is set in such away that the converter 50 side downloads the connection program of a prescribed equipment category using the DIP switch, this is not a must. Alternatively, as an example, the connection program of a prescribed equipment category can be selected using a GUI (graphical user interface) on the host 110 side and the selected connection program can be provided from the host 110 to the converter 50.

According to the second preferred embodiment, since the program capacity to be downloaded can be limited by changing over a DIP switch provided for a converter, a storage unit with a smaller capacity than that of the first preferred embodiment can be used. Since the capacity of the program to be downloaded is small, the download time can be shortened.

As described above, the converter in the preferred embodiment of the present invention for converting communication methods and/or protocols between medical equipment and a medical support control device for controlling the medical equipment in order to enable communications between them comprises a first communication interface, a second communication interface, a determination unit, and a communication control unit. The converter corresponds to the converter 50 in the preferred embodiment of the present invention.

The first communication interface is a communication interface corresponding to the communication interface of the medical support control device. The second communication interface is a plurality of communication interfaces corresponding to each piece of the medical equipment in order to connect the medical support control device to a plurality of pieces of medical equipment whose communication methods and/or protocols are different. The medical support control device corresponds to the host computer 110 or the system controller 22 in the preferred embodiment of the present invention.

The determination unit determines whether a communication connection can be established between the medical equipment and the converter, which are connected through the second communication interface, on the based of a connection program of the communication program according to the medical equipment. The determination unit corresponds to the CPU 52 in the preferred embodiment of the present invention.

The communication control unit obtains the difference between the communication program corresponding to the medical equipment identified by the determination unit and the connection program or the full communication program corresponding to the medical equipment identified by the determination unit from the medical support control device and exchanges communication protocols between the medical support control device and the medical equipment. The communication control unit corresponds to the CPU 52 in the preferred embodiment of the present invention.

Thus the medical equipment can be easily connected to the medical support control device without paying any attention to the difference in communication method and protocol between them.

By executing the connection program, the determination unit sequentially transmits signals corresponding to the plurality of communication methods to the medical equipment connected through the second communication interface and identifies the communication method of the medical equipment. Thus the communication method of the medical equipment can be identified.

Furthermore, after identifying the communication method of the medical equipment, the determination unit identifies the communication protocol of the medical equipment. Thus the communication protocol of the medical equipment can be identified.

When obtaining the remaining program of the communication program, the communication control unit merges the remaining program with the connection program. Thus, since there is no need to download a full communication program including a connection program, communication traffic jams can be reduced.

The converter can also further comprise a storage unit for storing at least the connection programs. Thus, since it is sufficient to store only connection programs in the storage unit, no large capacity of memory is needed and the converter can be miniaturized.

When the communication interface of the medical support control device is connected to the first communication interface, the connection program is obtained from the medical support control device and is stored in the storage unit.

Thus there is no need to fix and store connection programs on the converter side and the latest connection programs can always be obtained by maintaining the connection programs that were stored in a medical support control device most recently.

The storage unit is a storage device built in the converter or a portable storage medium that can be attached/detached to/from the converter. Thus a connection program can be also stored in the storage device built in the converter. Alternatively, a connection program can also be executed by mounting a portable storage medium storing connection programs in advance. Thus, the labor needed to download a connection program can be reduced.

The converter can also further comprise a selection unit capable of selecting the category of prescribed medical equipment of the plurality of pieces of medical equipment. Thus a connection program corresponding to the selected medical equipment category of all the connection programs obtained from the medical support control device through the first communication interface is obtained. The selection unit corresponds to the DIP switch (rotary switch 70) in the preferred embodiment of the present invention.

Thus the capacity of a connection program to be obtained in advance can be reduced to a comparatively low level.

What is claimed is:

1. A converter which converts communication methods and/or communication protocols in order to enable communications between medical equipment and a medical support control device for controlling the medical equipment, comprising:
 a first communication interface corresponding to a communication interface of the medical support control device;
 a plurality of second communication interfaces corresponding to a respective communication interface of each piece of medical equipment in order to connect the medical support control device and a plurality of pieces of medical equipment whose communication methods and/or communication protocols are different;
 a storage unit for storing at least a connection program from among plural communication programs about the medical equipment;
 a determination unit for determining whether a communication connection can be established between each of the plurality of pieces of medical equipment connected through the second communication interface and the converter on a basis of the connection program;
 a communication control unit for obtaining a difference between the communication program corresponding to the medical equipment identified by the determination unit and the connection program from the medical support control device, and converting the communication protocols of the medical equipment and the medical support control device with each other by means of a communication program composed of the difference and the connection program; and
 a selection unit capable of selecting a category of prescribed medical equipment of the plurality of pieces of medical equipment, wherein
 the first communication interface obtains a connection program corresponding to medical equipment in the selected category of all the connection programs obtained by the medical support control device.

2. The converter according to claim 1, wherein
 by executing the connection program, the determination unit sequentially transmits signals corresponding to the plurality of communication methods to the medical equipment connected through the second communication interface and identifies a communication method of the medical equipment.

3. The converter according to claim 2, wherein
 after identifying a communication method of the medical equipment, the determination unit further identifies a communication protocol of the medical equipment.

4. The converter according to claim 1, wherein
 when the medical support control device and the first communication interface are connected, the connection program is obtained from the medical support control device and is stored in the storage unit.

5. The converter according to claim 1, wherein the storage unit is a storage device built into the converter or a portable storage medium that can be attached to the converter and be detached from the converter.

6. A medical support control system, comprising:
medical equipment;
a medical support control device for controlling the medical equipment;
a converter for converting communication methods and/or communication protocols between the medical equipment and the medical support control device in order to enable communications between them, wherein
the converter comprises
a first communication interface corresponding to a respective communication interface of the medical support control device;
a plurality of second communication interfaces corresponding to a communication interface of each piece of medical equipment in order to connect the medical support control device and a plurality of pieces of medical equipment whose communication methods and/or communication protocols are different;
a storage unit for storing at least a connection program from among plural communication program about the medical equipment;
a determination unit for determining whether a communication connection can be established between each of the plurality of pieces of medical equipment connected through the second communication interface and the converter on the basis of the connection program;
a communication control unit for obtaining a difference between the communication program corresponding to the medical equipment identified by the determination unit and the connection program from the medical support control device and converting the communication protocols of the medical equipment and the medical support control device with each other by means of a communication program composed of the difference and the connection program; and
a selection unit capable of selecting a category of prescribed medical equipment of the plurality of pieces of medical equipment, wherein
the first communication interface obtains a connection program corresponding to medical equipment in the selected category of all the connection programs obtained by the medical support control device.

7. The medical support control system according to claim 6, wherein by executing the connection program, the determination unit sequentially transmits signals corresponding to the plurality of communication methods to the medical equipment connected through the second communication interface and identifies a communication method of the medical equipment.

8. The medical support control system according to claim 7, wherein after identifying a communication method of the medical equipment, the determination unit further identifies a communication protocol of the medical equipment.

9. The medical support control system according to claim 6, wherein when the medical support control device and the first communication interface are connected, the connection program is obtained from the medical support control device and is stored in the storage unit.

10. The medical support control system according to claim 6, wherein the storage unit is a storage device built in the converter or a portable storage medium that can be attached to the converter and be detached from the converter.

11. A communication method/protocol converting method by a converter installed between medical equipment and a medical support control device for controlling the medical equipment, wherein
when being connected to the medical support control device by a first communication interface corresponding to a communication interface of the medical support control device and being connected to the medical equipment by one of the plurality of second communication interfaces corresponding to a communication interface of each piece of the medical equipment in order to connect the medical support control device and a plurality of pieces of medical equipment whose communication methods and/or communication protocols are different, the converter reads at least a connection program from among plural communication program about the medical equipment stored in a storage unit and determines whether a communication connection can be established between the medical equipment connected through the second communication interface and the converter on a basis of the connection program;
obtains a difference between the communication program corresponding to the identified medical equipment and the connection program from the medical support control device and converts the communication protocols of the medical equipment and the medical support control device with each other by means of a communication program composed of the difference and the connection program;
wherein
selecting a category of prescribed medical equipment of the plurality of pieces of medical equipment; and,
obtaining a connection program corresponding to medical equipment in the selected category from among all the connection programs obtained by the medical support control device.

12. The communication method/protocol converting method according to claim 11, wherein
when the connection program is executed, signals corresponding to the plurality of communication methods are sequentially transmitted to the medical equipment connected to the second communication interface and a communication method of the medical equipment is identified.

13. The communication method/protocol converting method according to claim 12, wherein
after a communication method of the medical equipment is identified, a communication protocol of the medical equipment is further identified.

14. The communication method/protocol converting method according to claim 11, wherein
when the medical support control device and the first communication interface are connected, the connection program is obtained from the medical support control device and is stored in the storage unit.

15. The communication method/protocol converting method according to claim 11, wherein
the storage unit is a storage device built in the converter and a portable storage medium that can be attached to the converter and be detached from the converter.

* * * * *